(12) United States Patent
Lu et al.

(10) Patent No.: US 7,748,669 B2
(45) Date of Patent: Jul. 6, 2010

(54) ADJUSTABLE HOLDING FRAME

(75) Inventors: Kun-Yen Lu, Taipei (TW); Rui-Lin Wang, Taipei (TW)

(73) Assignee: Kinpo Electronics, Inc., Taipei (TW)

( * ) Notice: Subject to any disclaimer, the term of this patent is extended or adjusted under 35 U.S.C. 154(b) by 873 days.

(21) Appl. No.: 11/610,684

(22) Filed: Dec. 14, 2006

(65) Prior Publication Data

US 2008/0142649 A1    Jun. 19, 2008

(51) Int. Cl.
*F16M 11/14* (2006.01)
(52) U.S. Cl. .............................. 248/181.1; 248/288.31; 403/56
(58) Field of Classification Search .............. 248/181.1, 248/181.2, 288.31, 187.1, 288.51, 122.1, 248/124.1, 182.1; 403/56, 76, 90, 122, 144, 403/DIG. 1
See application file for complete search history.

(56) References Cited

U.S. PATENT DOCUMENTS

| | | | | |
|---|---|---|---|---|
| 654,051 A * | 7/1900 | Brown et al. | .................. | 403/71 |
| 807,857 A * | 12/1905 | Palmenberg | ................. | 403/77 |
| 2,332,504 A * | 10/1943 | Brenner | .................... | 248/181.1 |
| 2,670,228 A * | 2/1954 | Pagliuso | ..................... | 403/137 |
| 2,736,580 A * | 2/1956 | Boetcker | .................... | 403/132 |
| 2,752,116 A * | 6/1956 | Minnis | .................... | 248/181.1 |
| 2,859,983 A * | 11/1958 | May | ............................ | 285/90 |
| 3,211,405 A * | 10/1965 | Fey et al. | ................. | 248/183.2 |
| 3,632,073 A * | 1/1972 | Nakatani | .................... | 248/169 |
| 4,531,855 A * | 7/1985 | Wallis | ......................... | 403/55 |
| 4,708,510 A * | 11/1987 | McConnell et al. | .......... | 403/90 |
| 4,974,802 A * | 12/1990 | Hendren | .................. | 248/181.1 |
| 5,782,572 A * | 7/1998 | Thiem | ......................... | 403/90 |
| 5,790,910 A * | 8/1998 | Haskin | ....................... | 396/427 |
| 7,163,181 B2 * | 1/2007 | Omps | ....................... | 248/181.1 |
| 7,281,693 B2 * | 10/2007 | Chou | ....................... | 248/181.1 |
| 7,572,074 B2 * | 8/2009 | Teratani | ...................... | 396/428 |
| 2004/0118985 A1 * | 6/2004 | Omps | ....................... | 248/181.1 |
| 2008/0142675 A1 * | 6/2008 | Lu et al. | ..................... | 248/676 |

* cited by examiner

*Primary Examiner*—Kimberly T Wood
(74) *Attorney, Agent, or Firm*—Muncy, Geissler, Olds & Lowe, PLLC (57) ABSTRACT

An adjustable holding frame mainly includes a first bar, a second bar and an adjusting means. The second bar has one end fastened to a lump element which is pivotally located in the adjusting means. The adjusting means is mounted onto the first bar and has a helical structure to adjust the position of a seat in the adjusting means. Thereby releasing or fastening of the lump element of the second bar can be controlled to adjust the posture condition of the holding frame.

14 Claims, 8 Drawing Sheets

ADJUSTABLE HOLDING FRAME

BACKGROUND OF THE INVENTION

1. Field of the Invention

The present invention relates to an adjustable holding frame and particularly to an adjustable holding frame that has an adjustable means to adjust posture of the holding frame.

2. Description of the Prior Art

Conventional portable electronic devices such as handsets (mobile phones), PDAs, GPS (satellite navigators) and the like can provide convenient communication functions, thus are well accepted on the market. Those portable electronic devices are often being installed on vehicles to enable users to use during driving or riding on the transportation vehicles.

Various types of holding frames for holding portable electronic devices are available in prior art. They usually consist of a transformable bar structure or a plurality of bars pivotally coupled together and a rotary fastening mechanism to adjust the tightness of a pivotal axle so that the bars can be swiveled about the pivotal axle relative to each other or fixed at required locations to form a desired posture for the holding frame to facilitate user operation. However, the transformable bar structure mentioned above usually does not have desired steadiness and rigidity. It tends to sway when the vehicle is moving. Moreover, the rotary fastening mechanism on the holding frame formed by the pivotal bars is prone to loosening. It also is not convenient to use and creates a risk concern during driving.

Thus the present invention is aimed to provide a holding frame that overcomes the drawbacks of the prior art, and the holding frame according to the present invention is beneficial for supporting some kinds of consumer electric equipment or the said portable electronic devices.

SUMMARY OF THE INVENTION

In view of the aforesaid problems occurred to the conventional holding frames, the present invention aims to provide an adjustable holding frame for holding a potable electronic device.

Another object of the invention is to provide an adjustable holding frame that has an adjusting means to pivotally couple bars in the holding frame and allow the bars to be selectively formed in a swiveling condition or an anchoring condition to adjust the holding frame in a desired posture condition.

Yet another object of the invention is to provide an adjustable holding frame that has an adjustable means which includes a helical structure to facilitate operation of the posture adjustment of the holding frame.

To achieve the foregoing objects the adjustable holding frame according to the invention mainly includes a first bar, a second bar and an adjusting means. The second bar has one end fastened to a lump element which is pivotally located in the adjusting means. The adjusting means is mounted onto the first bar. The adjustable means has a seat which is slidable. The seat can be moved in the adjustable means through a helical structure or threaded structure within a horizontal range between a first position and a second position. Thereby the lump element pivotally held in the adjustable means can be compressed by the seat to enter a unfastening condition or a fastening condition, and the second bar fastened to the lump element also can be unfastened or fastened for adjusting the posture condition of the holding frame.

There is also a housing which has a notch on one side. The seat has a handle on one side. The notch runs through a hollow portion to mate the handle so that the handle can be moved to drive the seat horizontally. The notch has two ends which form the moving range of the handle corresponding to the first position and the second position of the seat.

Moreover, the first bar has a bottom end fastenable to a base dock so that the first bar may be mounted onto a selected surface. The second bar has a top end fastenable to a holding dock to hold a selected electronic device.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
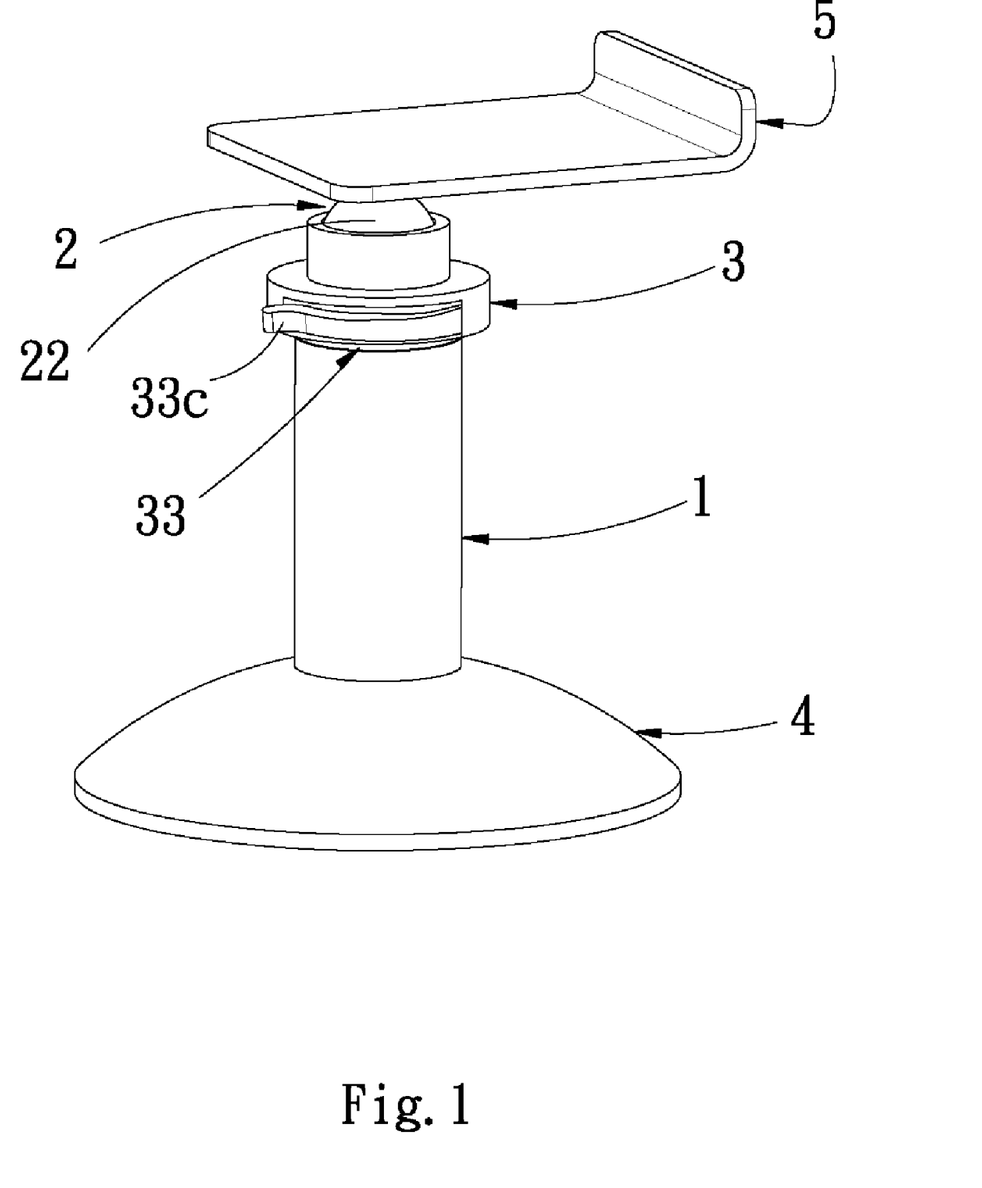
FIG. 1 is a perspective view of an embodiment of the adjustable holding frame of the invention.

Refer to FIG. 1 for an embodiment of the adjustable holding frame of the invention. It mainly includes a first bar 1 and a second bar 2 that are coupled together through an adjusting means 3 to form a joint structure so that the first bar 1 and the second bar 2 can be formed in a swiveling condition or an anchoring condition relative to each other to enable the holding frame to form a desired posture condition.

Figure 2:
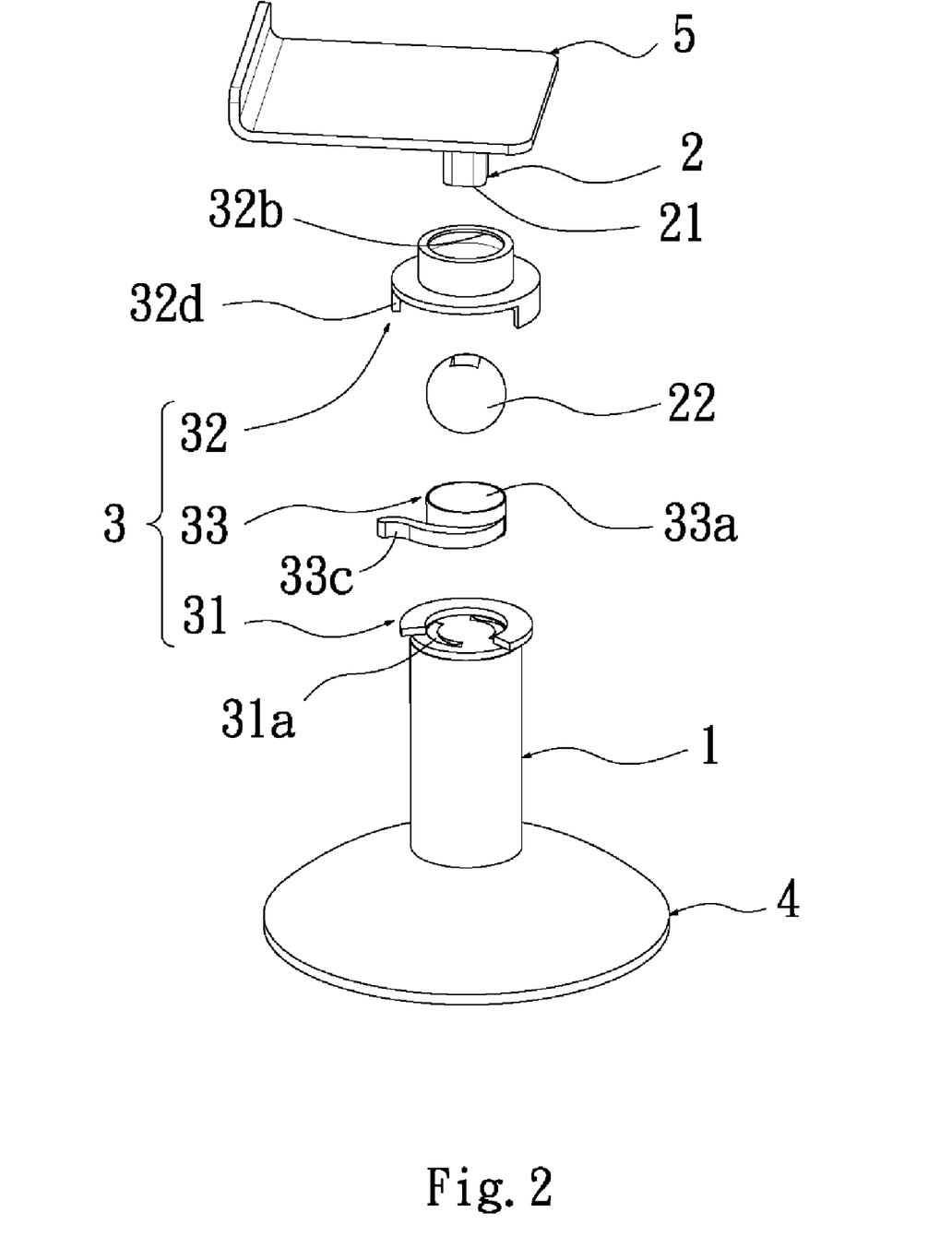
FIG. 2 is an exploded view of an embodiment of the invention.

Also referring to FIG. 2, the adjustable means 3 is fastened to one end of the first bar 1. The second bar 2 has a connection end 21 on one end to fasten to a lump element 22. The lump element 22 has a diameter greater than the connection end 21. The adjusting means 3 has a base 31, a housing 32 and a seat 33. Also referring to FIGS. 3 and 4, the base 31 is mounted onto the first bar 1, and has a first sloped surface portion 31*a* which is a helical structure surrounding the upper surface of the base 31 in a gradually higher or lower manner. The housing 32 is mounted onto the base 31 and has a hollow interior to form a hollow portion 32*a* with the base 31. The housing 32 has a upper opening 32*b* on a top end surface leading to the hollow portion 32*a*. The hollow portion 32*a* has an inner surface on which a portion forms a upper coupling surface 32*c*. The seat 33 is a cylinder and held in the hollow portion 32*a* and can be moved vertically up and down therein. The seat 33 has a lower coupling surface 33*a* on a top end surface corresponding to the upper coupling surface 32*c* to match the contour of the lump element 22 such that the lower coupling surface 33*a* and the upper coupling surface 32*c* jointly form a space to encase the lump element 22. When the lower coupling surface 33*a* and the upper coupling surface 32*c* are moved close to each other, they gradually compress the lump element 22 and eventually anchor the lump element 22. When the lower coupling surface 33*a* and the upper coupling surface 32*c* are moved away from each other, the lump element 22 is released and can rotate freely between the lower coupling surface 33a and the upper coupling surface 32c. The seat 33 further has a second sloped surface portion 33b on the bottom end surface that is also formed in a helical structure surrounding the bottom end surface of the seat 33 and can be moved gradually up or down corresponding to the first sloped surface portion 31a. Thereby the seat 33 and the housing 31 can rotate relative to each other while the first sloped surface portion 31a and the second sloped surface portion 33b are moved relative to each other on a sloped surface to move the seat 33 upwards or downwards.

Figure 3:
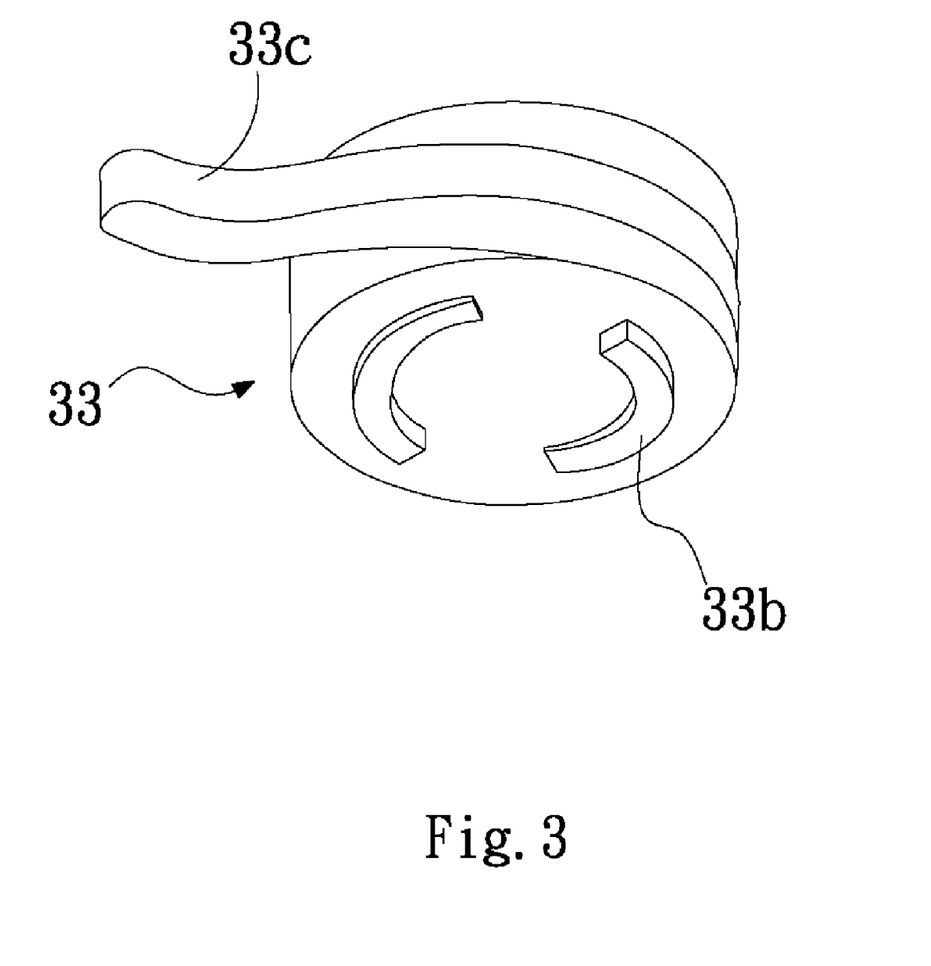
FIG. 3 is a fragmentary perspective view of the adjusting means of the invention.
Figure 4:
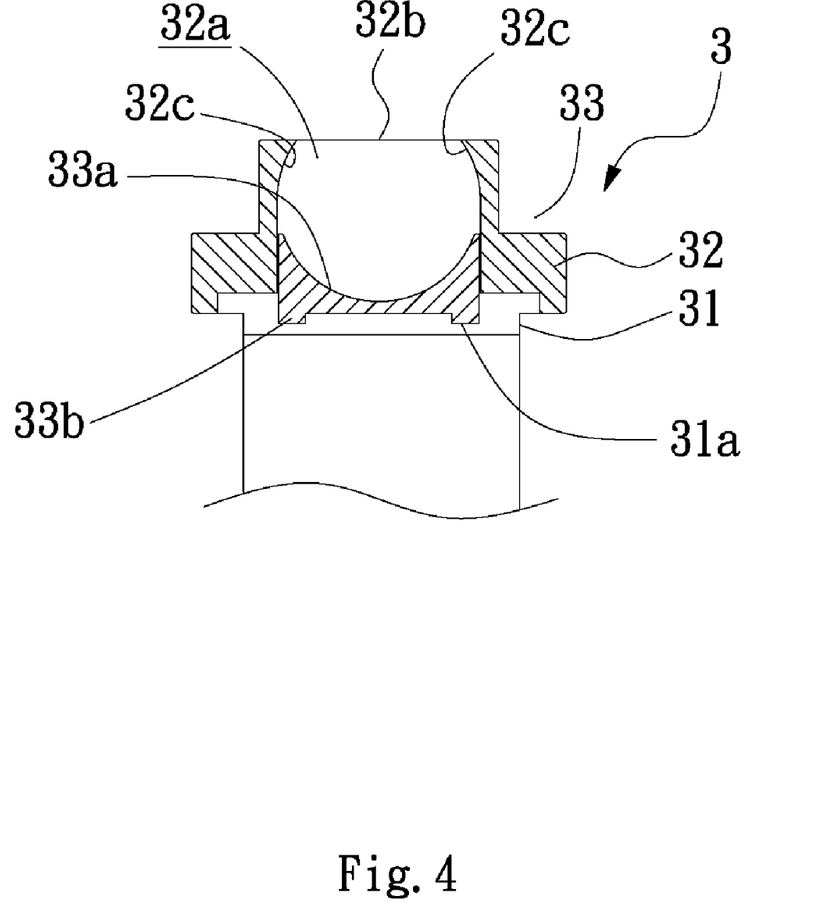
FIG. 4 is a sectional view of the adjusting means of the invention.

In the embodiment previously discussed, the second sloped surface portion 33b and the first sloped surface portion 31a form a complementary structure. Hence when the second sloped surface portion 33b and the first sloped surface portion 31a rotate against each other, they guide each other to make the structure steadier. Take an embodiment as an example, the first sloped surface portion 31a is a helical structure indented into the surface of the base 31, while the second sloped surface portion 33b is a helical structure extended outside the surface of the seat 33 to form the complementary structure with the first sloped surface portion 31a. Hence when the seat 33 and the base 31 rotate against each other the first sloped surface portion 31a and the second sloped surface portion 33b generate a relative movement on the sloped surface, and the second sloped surface portion 33b is guided by the first sloped surface portion 31a so that the movement and structure of the mechanism are steadier.

The housing 32 has a notch 32d on one side leading to the hollow portion 32a. The seat 33 has a handle 33c on one side extended radially outwards to mate the notch 32d. Thereby moving the handle 33c can drive the seat 33 to rotate, and also generate relative rotation between the second sloped surface portion 33b and the first sloped surface portion 31a. The notch 32d is formed at a selected length along the perimeter of the housing 32 to limit moving range of the handle 33c. The notch 32d has two ends corresponding to the rotation limits of the seat 33 in the positive and negative directions. One limit enables the seat 33 to rise sufficiently to compress and anchor the lump element 22. Another limit enables the seat 33 to lower sufficiently to release the lump element 22.

The first bar 1 may further have the bottom end mounting onto a base dock 4 to install the first bar 1 steadily onto a selected surface. For instance, the base dock 4 may be a circular tray with a suction structure (not shown in the drawings) on the bottom surface to be attached to the glass of a vehicle to mount the first bar 1 thereon. The second bar 2 may have the top end fastened to a holding dock 5 to hold a selected electronic device. For instance, the holding dock 5 may be a PDA holding dock (not shown in the drawings) to hold a PDA on the glass of a vehicle to facilitate operation of the PDA or reading of the information displayed on the PDA for the driver or passengers.

Referring to FIG. 4, the lump element 22 fastened to the connection end 21 of the second bar 2 may be spherical. The second bar 2 runs through the upper opening 32b of the housing 32. The lump element 22 is held in the hollow portion 32a of the housing 32 so that it is confined between the upper coupling surface 32c of the housing 32 and the lower coupling surface 33a of the seat 33.

Figure 5:
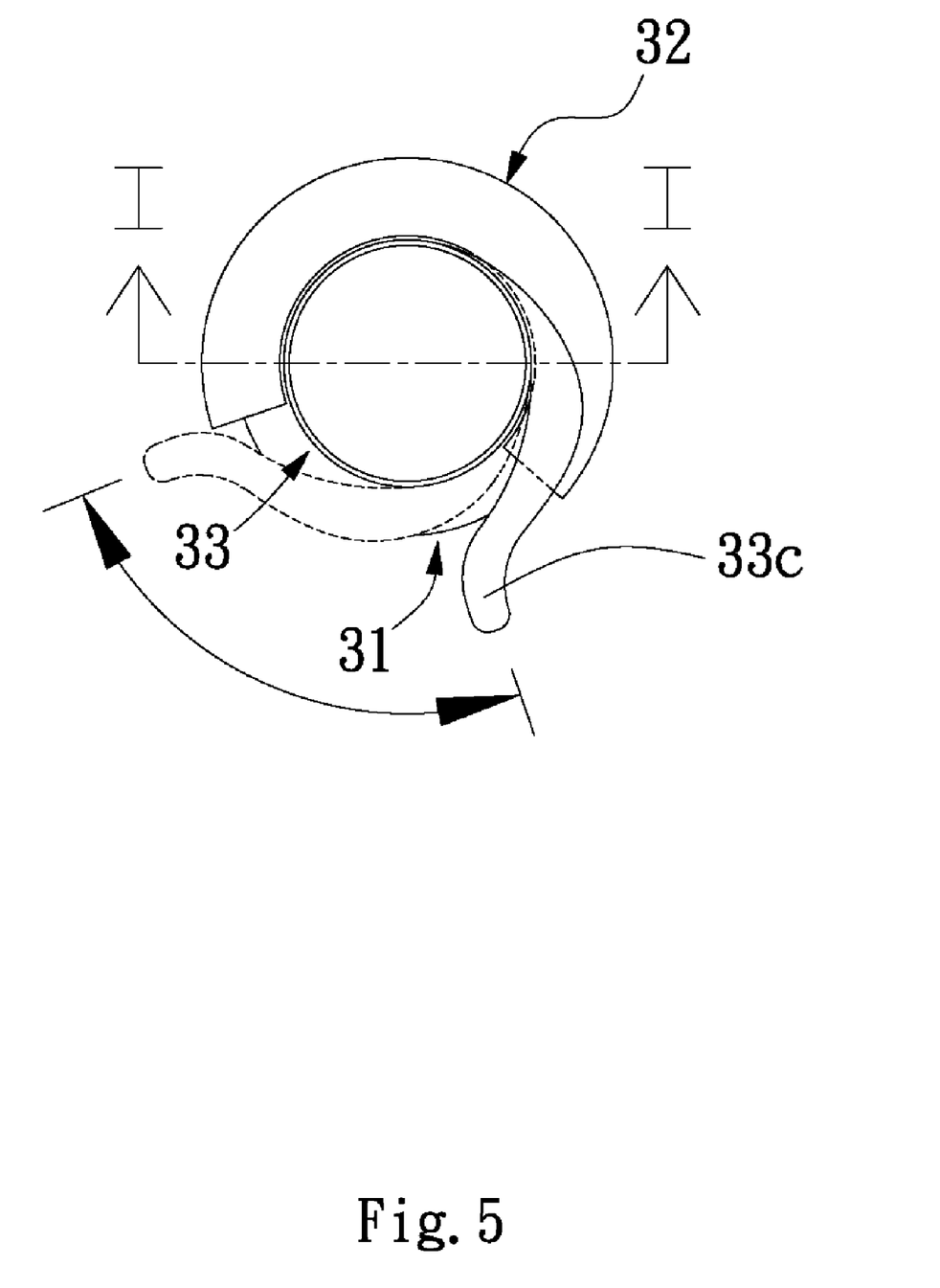
FIG. 5 is a schematic view of the adjusting means of the invention in an operating condition.
Figure 6:
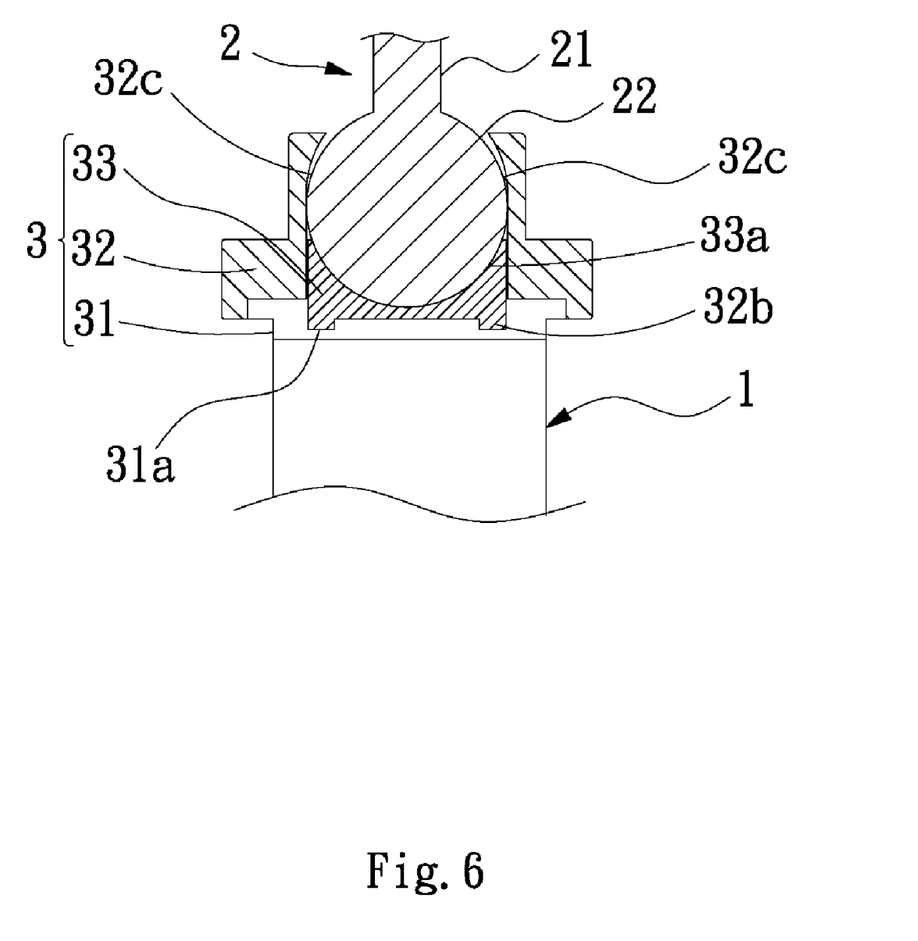
FIG. 6 is a sectional view of the adjusting means of the invention in a first condition.
Figure 7:
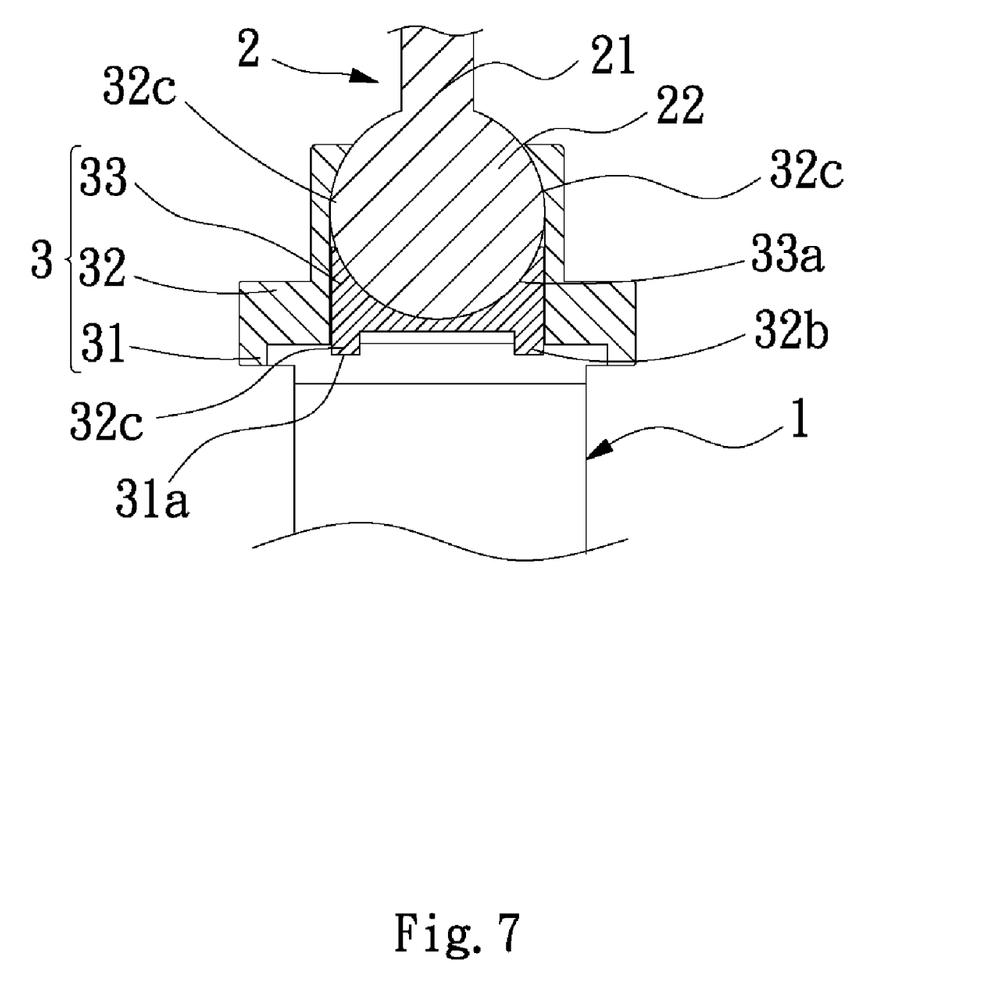
FIG. 7 is a sectional view of the adjusting means of the invention in a second condition.

Refer to FIGS. 5, 6 and 7 for the invention in various use conditions. The two ends of the notch 32d of the housing 32 on the perimeter are defined as a first end and a second end that correspond to a first condition and a second condition of the seat 33. In FIG. 5 the solid lines show the handle 33c is moved to the first end, and the seat 33 is in the first condition. The broken lines in FIG. 5 show the handle 33c is moved to the second end and the seat 33 is in the second condition. Referring to FIG. 6, the first sloped surface portion 31a of the base 31 is corresponding to the second sloped surface portion 33b of the seat 33 so that when the seat 33 is in the first condition it is at a lower position due to the mating relationship of the first sloped surface portion 31a and the second sloped surface portion 33b, and a larger space is formed between the upper coupling surface 32c and the lower coupling surface 33a. Thereby the lump element 22 of the second bar 2 can rotate freely between the lower coupling surface 33a and the upper coupling surface 32c, and the posture condition of the mechanism formed by the first bar 1 and the second bar 2 can be altered as desired. Referring to FIG. 7, when the seat 33 is in the second condition, the first sloped surface portion 31a and the second sloped surface portion 33b are interacted to raise the seat 33 at a higher position, and a smaller space is formed between the upper coupling surface 32c and the lower coupling surface 33a so that the lump element 22 is compressed and anchored between them without swiveling. Thereby the mechanism formed by the first bar 1 and the second bar 2 can be anchored at a desired position.

Figure 8:
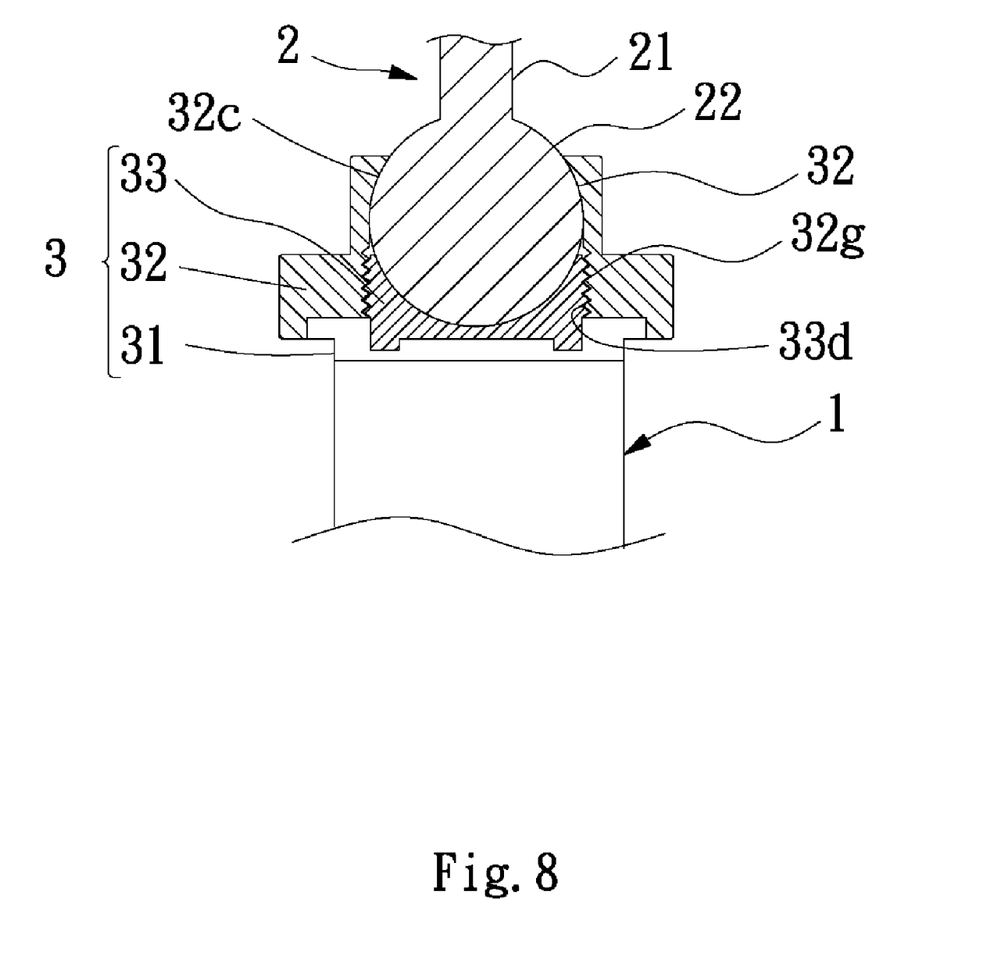
FIG. 8 is a cross section of another embodiment of the adjusting means of the invention taken on line I-I in FIG. 5.

Refer to FIG. 8 for another embodiment of the invention. The first sloped surface portion 31a on the upper surface of the base 31 and the second sloped surface portion 33b on the lower surface of the seat 33 in the previous embodiment become a first sloped surface portion 32g on an inner surface of the housing 32 and a second sloped surface portion 33d on an outer surface of the seat 33 in this embodiment. Similarly, the first sloped surface 32g surrounds the inner surface of the housing 32 to form an internal threaded structure corresponding to the second sloped surface portion 33b, while the second sloped surface portion 33d surrounds the outer surface of the housing 32 to form an external threaded structure so that the first sloped surface portion 32g and the second sloped surface portion 33d are engageable with each other. When the seat 33 and the housing 32 rotate against each other, the first sloped surface portion 32g and the second sloped surface portion 33d generate a relative movement on the sloped surface to raise or lower the seat 33.

By means of the construction of the adjustable holding frame of the invention set forth above, as shown in FIG. 1, the base dock 4 can anchor the first bar 1 on a selected surface (such as the glass of a vehicle), and the holding dock 5 can hold an electronic device (such as PDA, LCD or the like). Hence the electronic device can be positioned on the selected surface. Through the adjusting means 3 the positions of the first bar 1 and the second bar 2 can be adjusted to facilitate user's operation of the electronic device or reading of the information displayed on the electronic device.

While the preferred embodiment of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An adjustable holding frame, comprising:
    a first bar;
    a second bar which has one end fastening to a lump element; and
    an adjustable means which includes:
    a base which is fastened to the first bar and an upper surface forming a first sloped surface portion which is a helical structure surrounding the upper surface at a gradually increasing height;

a housing which is hollow and mounted onto the base to form a hollow portion with the base, and has an upper opening on a top end surface leading to the hollow portion, the hollow portion having an inner surface which has a portion forming an upper coupling surface, the housing having a notch on one side leading to the hollow portion; and a seat which is a cylinder and is slidable in the hollow portion of the housing, and has a top end surface forming a lower coupling surface corresponding to the upper coupling surface to mate the contour of the lump element, and a bottom end surface forming a second sloped surface portion which is another helical structure surrounding the bottom end surface at a gradually increasing height corresponding to the first sloped surface portion, the seat having a handle on one side extended radially outwards corresponding to the location of the notch;

wherein the hollow portion limits the sliding movement of the seat within a range of a first position and a second position, and the first sloped surface portion and the second sloped surface portion selectively set the seat at either a first position or a second position; at the first position the lower coupling surface and the upper coupling surface compressing and anchoring the lump element; at the second position the lower coupling surface and the upper coupling surface releasing the lump element.

2. The adjustable holding frame of claim 1, wherein the second sloped surface portion and the first sloped surface portion form a complementary structure.

3. The adjustable holding frame of claim 2, wherein the first sloped surface portion on the base is a helical structure indented into the surface thereof and the second sloped surface portion on the bottom of the seat is another helical structure extended outside the surface thereof.

4. The adjustable holding frame of claim 1, wherein the notch has two sides forming two limit positions of rotation of the seat, one limit position allowing the seat to raise to compress and anchor the lump element, another limit position allowing the seat to lower to release the lump element.

5. The adjustable holding frame of claim 1, wherein the lump element is spherical.

6. The adjustable holding frame of claim 1, wherein the first bar has a bottom end mounting onto to a base dock.

7. The adjustable holding frame of claim 1, wherein the second bar has a top end fastening to a holding dock.

8. An adjustable holding frame, comprising:
a first bar;
a second bar which has one end fastening to a lump element; and
an adjustable means which includes:
a base which is fastened to the first bar;
a housing which is hollow and mounted onto the base to form a hollow portion with the base, and has an upper opening on a top end surface leading to the hollow portion, the hollow portion having an inner surface which has a portion forming an upper coupling surface and a first sloped surface portion which has an internal threaded structure surrounding the inner surface of the housing, the housing having a notch on one side leading to the hollow portion; and a seat which is a cylinder and movable vertically in the hollow portion of the housing, and has a top end surface forming a lower coupling surface corresponding to the upper coupling surface to mate the contour of the lump element, and a bottom end surface forming a second sloped surface portion which has an external threaded structure surrounding the outer surface of the seat and corresponding to the first sloped surface portion, the seat having a handle on one side extended radially outwards corresponding to the location of the notch;

wherein the hollow portion limits the sliding movement of the seat within a range of a first position and a second position, and the first sloped surface portion and the second sloped surface portion selectively set the seat at either a first position or a second position; at the first position the lower coupling surface and the upper coupling surface compressing and anchoring the lump element; at the second position the lower coupling surface and the upper coupling surface releasing the lump element.

9. The adjustable holding frame of claim 8, wherein the second sloped surface portion and the first sloped surface portion form a complementary structure.

10. The adjustable holding frame of claim 9, wherein the first sloped surface portion on the base is a threaded structure indented into the surface thereof, and the second sloped surface portion on the bottom of the seat is another threaded structure extended outside the surface thereof.

11. The adjustable holding frame of claim 8, wherein the notch has two sides forming two limit positions of rotation of the seat, one limit position allowing the seat to raise to compress and anchor the lump element, another limit position allowing the seat to lower to release the lump element.

12. The adjustable holding frame of claim 8, wherein the lump element is spherical.

13. The adjustable holding frame of claim 8, wherein the first bar has a bottom end mounting onto to a base dock.

14. The adjustable holding frame of claim 8, wherein the second bar has a top end fastening to a holding dock.

* * * * *